(12) United States Patent
Giles et al.

(10) Patent No.: US 6,192,302 B1
(45) Date of Patent: Feb. 20, 2001

(54) MOTOR VEHICLE DIAGNOSTIC SYSTEM AND APPARATUS

(75) Inventors: Peter John Giles, Ypsilanti, MI (US); John Cardillo, Windsor (CA); Herbert Thomas Meissner, South Lyon, MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/127,133

(22) Filed: Jul. 31, 1998

(51) Int. Cl.[7] .......................... G01M 15/00; G06F 11/32
(52) U.S. Cl. .................. 701/29; 701/29; 364/424.03; 364/424.04; 364/551.01; 73/116
(58) Field of Search .................. 701/29; 364/424.04, 364/551.01, 424.034; 73/116

(56) References Cited

U.S. PATENT DOCUMENTS

| 3,576,541 | 4/1971 | Kwan et al. | 340/172.5 |
|---|---|---|---|
| 4,242,751 | 12/1980 | Henckels et al. | 371/26 |
| 4,796,206 | * 1/1989 | Boscove et al. | 364/551.01 |
| 4,817,418 | * 4/1989 | Asami et al. | 73/118.1 |
| 5,003,479 | * 3/1991 | Kobyashi et al. | 364/424.03 |
| 5,063,516 | 11/1991 | Jamoua et al. | 364/431.11 |
| 5,090,014 | 2/1992 | Polich et al. | 371/15.1 |
| 5,127,005 | 6/1992 | Oda et al. | 371/15.1 |
| 5,144,225 | 9/1992 | Talbot et al. | 324/73.1 |
| 5,260,945 | 11/1993 | Rodeheffer | 371/8.2 |
| 5,313,388 | * 5/1994 | Cortis | 364/424.04 |
| 5,491,631 | * 2/1996 | Shirane et al. | 364/424.04 |
| 5,587,930 | 12/1996 | Hori et al. | 364/551.01 |
| 5,631,831 | * 5/1997 | Bird et al. | 364/424.034 |

OTHER PUBLICATIONS

Research Disclosure, Aug. 1997, Anonymous p. 512 RD–40030.

* cited by examiner

Primary Examiner—William A. Cuchlinski, Jr.
Assistant Examiner—Tuan To
(74) Attorney, Agent, or Firm—Frank G. McKenzie

(57) ABSTRACT

A system and method are provided for analyzing a motor vehicle operating problem. A number of tests are provided for the selected system or component to determine the cause of the problem. One of the tests are selected, and instructions are displayed for the selected test. A result is input for the selected test and it is determined whether the result indicates the problem was experienced during the test. If the problem was not experienced and that the test did not experience a failure, the state of the faults that are detectable by the test are set to substantially "Possible Intermittent Fault".

16 Claims, 3 Drawing Sheets

MOTOR VEHICLE DIAGNOSTIC SYSTEM AND APPARATUS

FIELD OF THE INVENTION

The present invention relates generally to vehicle analyzers and, more particularly, to a method and apparatus for diagnosing engine, transmission and/or vehicle system faults based on intermittent vehicle operating or drive symptoms.

BACKGROUND OF THE INVENTION

Motor vehicle analyzers have been around in various forms for some time. The extensive incorporation of computer control, sensors and other electronic and electrical components into motor vehicles to control engines, transmissions, antilock brakes, and other vehicle operating systems has forever changed vehicle servicing. While analyzers used to be optional or convenient for motor vehicle servicing, they now are a virtual necessity for assisting a mechanic in analyzing vehicle operating problems.

The inability to perform comprehensive diagnostic testing of systems including such components in the field can result in great inefficiencies and expense. For example, it is often difficult to determine whether an operating problem resides in a vehicle's engine or transmission. As a result, a number of transmissions which are removed and returned to the factory for repair turn out to be fault free. In many of the remainder of the returned transmissions, the problem can be corrected by a minor adjustment at the factory which easily could have been made in the field had the proper diagnosis been made.

A complicating factor in diagnostic testing is the proliferation of many different computer and/or electronically controlled systems. Differences can be substantial for different makes of cars, for different models from the same manufacturer, and even the same model line from year-to-year. The different systems are generally accompanied by different interfaces and data formats that limit any particular testing unit to only a relatively small number of vehicles. Stocking a large number of different monitors to accommodate the various makes and models is expensive, inefficient and wasteful. However, it is oftentimes difficult if not impossible to perform adequate field service without the use of these analyzers as previously noted.

Another problem is the difficulty of simulating normal driving conditions within the confines of an automotive repair facility, while at the same time monitoring the various systems to determine the location and nature of any malfunctions. Also, many automotive problems are intermittent and do not show up in a single test run. Such intermittent problems require the monitoring of a vehicle's performance over a sufficient, possibly long, period of time and under particular conditions such that data representative of a failing or faulty component can be collected when an intermittent malfunction does occur to enable effective diagnostic analysis. Often an intermittent problem will require a large amount of time to diagnose. One problem with prior tests is that the tree structure of such testing requires a technician to follow several false leads to termination, wasting a lot of time and perhaps missing the cause of the problem if it does not occur when evaluating a particular branch of the structure.

Unfortunately, adding to all these problems is the fact that most tree structures leave the technician little discretion in the order of testing. This limitation may require the technician to make several tests which could easily be ruled out or given lower priority based on experience. Accordingly, appropriate data may not be collected for hard faults much less intermittent faults.

It is thus apparent that there is a continuing need for improved diagnostic methods and apparatuses which can be used to diagnose motor vehicle system problems. For simplicity sake, the diagnosis preferably would be based on vehicle operating or drive symptoms which can be readily identified by an operator of a motor vehicle or by service personnel.

SUMMARY OF THE INVENTION

The present invention satisfies this need by providing an improved method and apparatus for the collection of vehicle operating data in a motor vehicle diagnosis or analysis system.

A system and method are provided for analyzing a motor vehicle operating problem. A number of tests are provided for the selected system or component to determine the cause of the problem. One of the tests are selected, and instructions are displayed for the selected test. A result is input for the selected test and it is determined whether the result indicates the problem was experienced during the test. If the problem was not experienced and the test did not experience a failure, the state of those faults that are detectable by the test is set to substantially "Possible Intermittent Fault".

Other features and advantages of the invention will be apparent from the following description, the accompanying drawings and the appended claims.

DETAILED DESCRIPTION OF PREFERRED EMBODIMENTS

The present invention provides a method and apparatus for the collection of vehicle operating data for diagnosis of the causes of problems within motor vehicle engine, transmission, and/or other operating systems.

The present invention takes a new approach to resolving vehicle concerns by providing a data base including one or more drivability symptoms and providing a number of tests to perform to pinpoint the cause of the concern. The tests are run and the results are input by a technician. The tests which could not cause the concern are ruled out and those which could contribute to the concern, but the concern is not detected, are given a state of being a potential cause of an intermittent failure.

Figure 1:
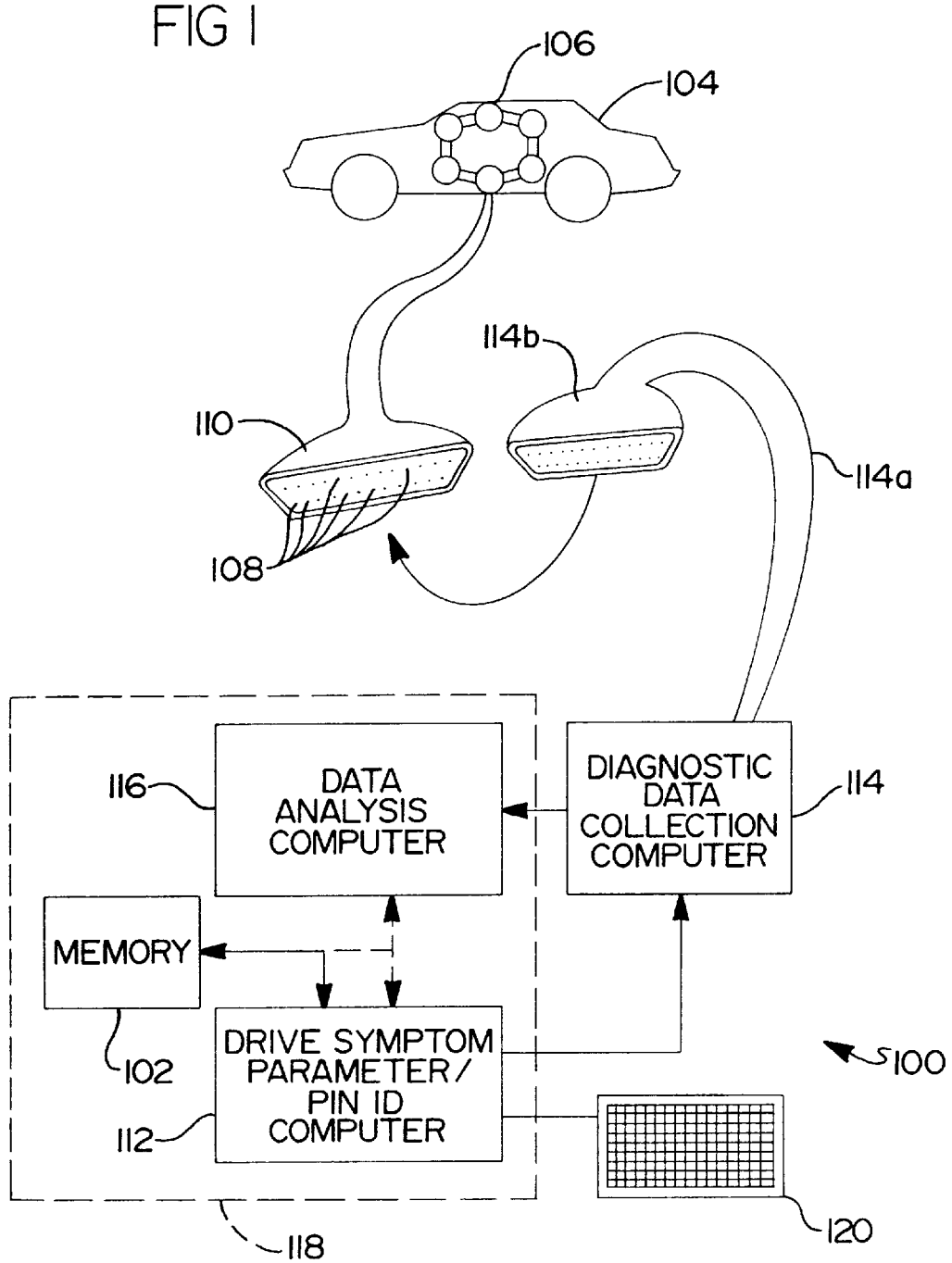
FIG. 1 is a schematic block diagram of an engine/vehicle diagnostic system including the present invention.

Reference will now be made to FIG. 1 which illustrates in schematic block diagram form a diagnostic system 100 operable in accordance with the present invention. The system 100 includes memory means, taking the form of a computer memory 102 in the illustrated embodiment, for storing data representative of motor vehicles to be serviced using the system 100, for example motor vehicle 104. Data stored in the memory 102 includes both motor vehicle identifying data and data identifying access points for obtaining vehicle operating data representative of the operation of systems within the motor vehicles. A variety of operating systems 106 are represented by the network configuration within the vehicle 104. Typical operating systems within the vehicle 104 include the vehicle engine control system, anti lock braking system, suspension system, transmission control system and the like.

The access points into the operating systems 106 typically take the form of conductors or pins 108 of a connector 110 which is included within the vehicle 104. The connector 110 is illustrated as a D-shaped connector which is provided on many popular motor vehicles, for example a sixty (60) pin D-shaped connector may be used. Computer means taking the form of a drive symptom parameter/pin identification computer 112 is provided for accessing the memory 102 in response to vehicle identification data and motor vehicle drivability symptoms indicative of operating problems being experienced by the operator of the motor vehicle 104. The computer 112 accesses the memory 102 to retrieve appropriate vehicle operating data access points, such as appropriate ones of the conductors or pins 108 of the connector 110, to be monitored for collecting data for analysis of the operating systems 106 most likely responsible for the drivability symptoms displayed by the motor vehicle 104. Alternatively, the connector 110 may interface directly with the engine or other system to be monitored.

The identity of the appropriate data access points is downloaded to diagnostic data collection means comprising a diagnostic data collection computer 114 (DDCC) in the illustrated embodiment. The diagnostic data collection computer 114 is thus configurable by the drive symptom parameter/pin identification computer 112 for collecting data from the appropriate access points. The diagnostic data collection computer 114 is connected to the operating systems 106 via a cable 114*a* and an appropriate connector 114*b* which intermates with the connector 110 thus providing access to the conductors or pins 108 thereof. It should be apparent that a single universal connector would preferably be provided on all motor vehicles; however, a variety of connectors can be interchangeably connected to the diagnostic data collection computer 114 for a corresponding variety of motor vehicle connectors. In a preferred embodiment, the OBD-II connector is used to obtain data for many such failures.

The system 100 further preferably comprises data analysis means comprising a data analysis computer 116 in the illustrative embodiment. The data analysis computer 11 is responsive to data collected by the diagnostic data collection computer 114, or integrated therein, for identifying one or more faults of one or more systems responsible for the vehicle 104 drivability symptoms.

The data analysis computer 116 may advantageously directly or indirectly access the memory 102 or exchange information with the drive symptom parameter/pin identification computer 112. Due to the highly interrelated nature of the memory 102, the drive symptom parameter/pin identification computer 112 and the data analysis computer 114 they may be combined into a single unit 118 as indicated by the dotted line box in FIG. 1. While the same may be said for the diagnostic data collection computer 114, it is advantageous to have it separate or separable from the remainder of the system 100 such that it can be mounted onto the motor vehicle 104 for road test purposes when adequate collection and storage means is not provided in the vehicle itself, such as in a powertrain control module (PCM).

Such on-board testing of the motor vehicle 104 is particularly advantageous for the diagnosis of intermittent faults. For example, the diagnostic data collection computer 114 can be programmed to continually monitor data occurring on the access points or pins 108 which were selected by and down loaded from the drive symptom parameter/pin identification computer 112. In the event of a fault indication in the monitored data, the diagnostic data collection computer then retains a portion of date preceding the fault indication and a portion of data following the fault with this data from the fault window effectively being used for diagnosis of the intermittent fault.

Figure 2:
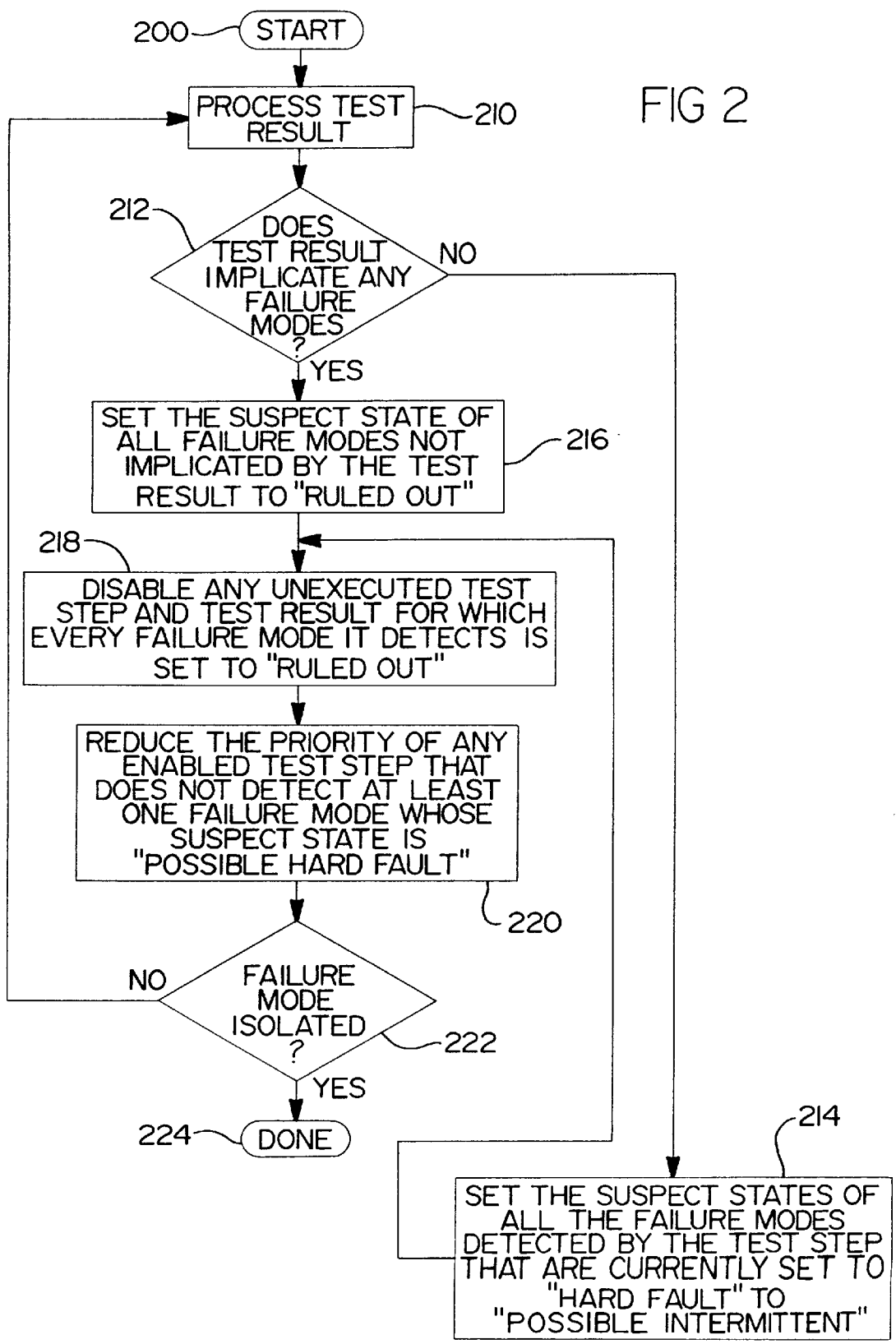
FIG. 2 is a flow chart showing operation of a diagnostic system in accordance with the present invention.

In the case of an intermittent fault, several unrelated potential failures may be easily dismissed. Reference will now be made to FIG. 2 which is a flow chart showing operation of the diagnostic system 100 in accordance with the present invention. The system 100 is initialized at 200, whereupon each failure mode (or fault) suspect state is reset to "Possible Hard Fault". Thus, no failure is immediately discarded, and each system is initially suspect. However, once the test is run 212, when a failure mode is indicated (i.e. the intermittent failure occurred), if a particular system or component cannot contribute to the failure 212, that particular failure mode is set to "ruled out" 216.

If, on the other hand, the intermittent failure did not occur, all states previously set to "possible hard fault" are set to "possible intermittent" 214.

At this point, we will continue to monitor only those systems which could contribute to a failure 218 (i.e. those not ruled out). The tests which were not ruled out are prioritized, such that those which could result in a "possible hard fault" are given priority over a "possible intermittent" 220. Once the failure mode is isolated 222, the test is stopped. If a definitive failure mode is not isolated, the next test is run 210 until the test is isolated to identify the failure mode.

The algorithm processes a test result to update the suspect states of failure modes and to disable conflicting and/or unnecessary unexecuted test steps. Thus, the time to execute the tests is reduced and the irrelevant or conflicting data is not considered, thereby increasing the accuracy of the results. Each test step includes a procedure designed to detect Failure Modes in the operation of a component of the system. The Test Results comprise a Test Step outcome that implicates zero or more failure modes. The Failure Modes comprise a potential malfunction in a component or the system. These Failure Modes are assigned a suspect state. The Suspect State comprises a state variable used by the test algorithm to indicate whether the failure mode is the root cause of the malfunction. The present invention assigns the following three values to the suspect state, including a "Possible Hard Fault", a "Possible Intermittent Fault" or a "Ruled Out" state.

Because vehicles operate in different manners, including electronic or mechanical controls, the data obtained likely will differ for each vehicle. Therefore, the computer must understand what data is is receiving and how that data affects the particular vehicle. It is therefore preferable that the computer know what vehicle it is monitoring, and therefore it is preferable to enter the identification of a motor vehicle to be serviced, such as the motor vehicle 104 of FIG. 1. Information is entered into the system 100 via a keyboard 120 or other input device, such as a touch screen. The identification may include make, model, year, serial number and the like. It is contemplated that the data stored in the memory 102 is updated on a routine basis such that problems which may arise in a given series of motor vehicles can be included even to the point of being located within a given series of serial numbers.

The entered vehicle identification is used to access a data point directory. The relevant data for the identified motor vehicle may be read out of the memory 102 into the drive symptom parameter/pin identification computer 112 or a given block or blocks of data may be flagged for use by the computer 112. In any event, the appropriate data, if stored in the memory 102 is made available to the computer 112.

Figure 3:
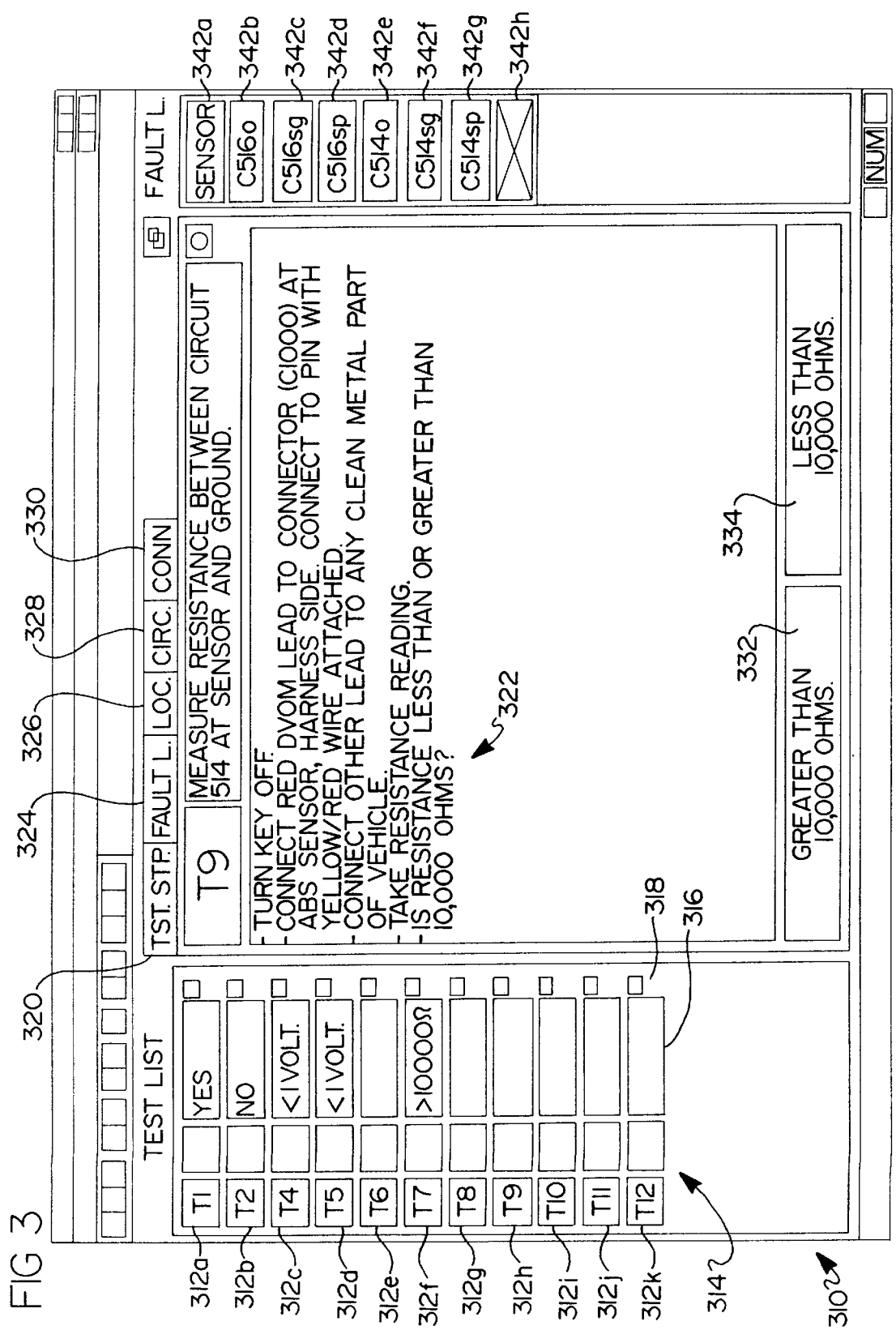
FIG. 3 is an exemplary display for a system in accordance with the present invention.

As illustrated in FIG. 3, a preferred embodiment provides a screen 310 for input by a technician. In this embodiment, data is input in a known manner through a mouse and keyboard, but one could easily substitute a touch screen. Preferably, the test is provided in a windows environment for ease and familiarity of input. The technician selects which system or component is to be tested, in this embodiment by opening the particular test file (file/open). In FIG. 3, a test for an Antilock Brake System (ABS) is provided for illustrative purposes. In this preferred embodiment, on the left side of the screen, a variety of tests are selectable though a number of touch buttons 312a–k. These buttons 312 are labeled with the test, for example, "T9-measure Resistance between Circuit 514 at Sensor and Ground".

A symbol 314 is provided adjacent the test button 312 to indicate to the technician the nature of the test—for example, visual or electrical hookup. A result box 316 is provided adjacent the symbol 314, and when the test is complete, the result appears. An indicator 318 is provided adjacent the result box 316 to indicate whether a particular test has been run.

A number of resource tabs 320–328 are provided. These tabs 320–328 indicate selectable information, for example tab 320, the test steps 322 for a particular test 312a–k. The test steps 322 tell the technician what steps are taken to perform the test. For the particular test step tab 320 relating to a particular test 312a–k, the potential results are provided 332, 334, and the operator selects the appropriate result (or the result is automatically entered if the computer collects the data) after the test steps are performed. Once the results are entered 332, 334, the result is indicated at 316 and the test status is indicated 318. Several Fault Suspect State buttons 342a–h are provided to indicate the state of the fault. As described above, the state may be either possible hard, possible intermittent or ruled out. As illustrated in FIG. 3, the states of the buttons are indicated, for example, as either solid 342b, gray 342a, or crossed out 342h to indicate the respective state. After each test, the state of the fault is updated. At that time, the operator may select the next test to conduct based on his experience by selecting a button 312a–k, or the screen 310 may indicate the next appropriate test. If a fault is ruled out, an inappropriate test button 312a–k may be disabled to prevent the technician from making unnecessary or incorrect tests.

Additional tabs 324–330 provide the technician additional information, including a list of faults 322, a graphical display of the fault 324, an illustration of the electrical circuit 326 and pin locations on the connector 328. These resources aid the technician in determining what the test steps require and assist in diagnosing the results. Preferably the repair manual for that vehicle is provided on these tabs to eliminate the need for a hard copy of that resource. Of course these tabs 322–330 are illustrative of the information provided, as they are customized for each component or system, such as the illustrated ABS system test.

If the system 100 is to be used for a road test, for example to diagnose an intermittent fault which cannot be duplicated while the vehicle is at the service facility, the diagnostic data collection computer 114 is installed and connected into the motor vehicle being serviced. If the system 100 is to be used at the service facility, the diagnostic data collection computer 114 is more simply connected to the motor vehicle to be serviced for example by the cable 114a without installation and possible separation of the diagnostic data collection computer 114 from the remainder of the system. In any event, the motor vehicle is operated and data appropriate for the diagnosis of operating system problems is collected by the diagnostic data collections computer 114. Preferably, this system is provided on a laptop computer and is therefore portable for such a road test.

Having thus described the present invention in detail and by reference to preferred embodiments thereof, it will be apparent that modifications and variations are possible without departing from the scope of the invention defined in the appended claims.

What is claimed is:

1. A diagnostic system for the analysis of motor vehicle operating problems, said system comprising:

memory for storing data representative of a motor vehicle to be serviced using said system and a plurality of tests therfor, said data including both motor vehicle identifying data and data identifying access points for obtaining vehicle operating data representative of the operation of systems within the motor vehicle, said data access points corresponding to pins of multiple pin connectors within the motor vehicle;

an input for inputting a result for a selected one of the tests;

a drive symptom parameter/pin identification computer for accessing said memory in response to vehicle identification data and motor vehicle drivability symptoms indicative of operating problems being experienced by the motor vehicle;

a diagnostic data collection computer configurable by said drive symptom parameter/pin identification computer for collecting data only from said access points;

a data analysis computer responsive to data collected by said diagnostic data collection computer for identifying one or more faults of one or more systems responsible for the vehicle drivability symptoms; and a fault indicator for indicating a Fault Suspect State for each of a plurality of faults related to the selected test, the Fault Suspect State having a plurality of values, one of said values comprising a "Possible Intermittent" state.

2. A diagnostic system according to claim 1, wherein each of the Fault Suspect States is assigned one of 3 values comprising "Possible Hard Fault", "Possible Intermittent Fault" and "Ruled Out".

3. A diagnostic system according to claim 2, further comprising means for setting the Fault State to "Ruled Out" if a fault is detected and a test cannot produce the fault.

4. A diagnostic system according to claim 2, further comprising means for increasing the priority of a test having a fault with the state of "Possible Hard Fault".

5. A diagnostic system according to claim 3, further comprising means for disabling the tests for faults having a state of "Ruled Out" for a subsequent test.

6. A diagnostic system according to claim 5, further comprising a display for displaying a plurality of steps for the selected test.

7. A diagnostic system according to claim 6, further comprising a display for displaying an illustration for the selected test.

8. A method for analyzing a motor vehicle operating problem, said method comprising:

storing data representative of a motor vehicle to be serviced and a plurality of tests therefor;

displaying potential tests to determine the cause of the problem;

selecting and conducting a selected one of the tests and observing a result therefor;

inputting the result from the selected test;

determining whether the result indicates any failure modes;

setting the state of all the failure modes that are detectable by the test that are currently set to "Possible Hard Fault" to "Possible Intermittent Fault"; and setting the state of all the failure modes that are not detectable by the test to "Ruled Out".

9. A diagnostic method according to claim 8, wherein each Fault Suspect State is set to a value from the group comprising "Suspect Hard Fault", "Suspect Intermittent Fault" and "Ruled Out".

10. A diagnostic method according to claim 8 further comprising the step of increasing the priority of a test for a fault with the state of "Suspected Hard Fault".

11. A diagnostic method according to claim 10, further comprising means for disabling a test for a fault having a state of "Ruled Out" for a subsequent test.

12. A diagnostic method according to claim 11, further comprising the step of displaying a plurality of steps for the selected test.

13. A diagnostic method according to claim 12, further comprising the step of displaying an illustration for the selected test.

14. A method for analyzing a motor vehicle operating problem, said method comprising:

selecting a system or component to be tested;

displaying a plurality of tests for the selected system or component;

selecting one of the tests to conduct;

displaying instructions for the selected test;

conducting the selected test and observing a result;

inputting the result for the selected test;

determining whether the result indicates any failure modes setting the state of all the failure modes that are detectable by the test that are currently set to "Possible Hard Fault" to "Possible Intermittent Fault"; and setting the state of all the failure modes that are not detectable by the test to "Ruled Out".

15. A method according to claim 14 further comprising the step of setting the state of all tests to "Possible Hard Fault" prior to running any of the tests and increasing the priority of a test having the state of "Possible Hard Fault" after running any one of the tests.

16. A method according to claim 15 further comprising the step of displaying an illustration for the selected test.

\* \* \* \* \*